US009283695B1

(12) United States Patent
Tseng et al.

(10) Patent No.: US 9,283,695 B1
(45) Date of Patent: Mar. 15, 2016

(54) COMPUTER-IMPLEMENTED SIMULATION METHOD AND NON-TRANSITORY COMPUTER MEDIUM CAPABLE OF PREDICTING FIBER ORIENTATION FOR USE IN A MOLDING PROCESS

(71) Applicant: CORETECH SYSTEM CO., LTD., Hsinchu County (TW)

(72) Inventors: Huan Chang Tseng, Hsinchu County (TW); Chia Hsiang Hsu, Hsinchu County (TW); Rong Yeu Chang, Hsinchu County (TW)

(73) Assignee: CORETECH SYSTEM CO., LTD., Hsinchu County (TW)

( * ) Notice: Subject to any disclaimer, the term of this patent is extended or adjusted under 35 U.S.C. 154(b) by 0 days.

(21) Appl. No.: 14/843,741

(22) Filed: Sep. 2, 2015

(51) Int. Cl.
   *B29C 39/00* (2006.01)
   *B29C 33/38* (2006.01)
   *G05B 19/4069* (2006.01)
   *G06F 17/50* (2006.01)

(52) U.S. Cl.
   CPC ........ *B29C 33/3835* (2013.01); *G05B 19/4069* (2013.01); *G06F 17/5009* (2013.01); *G05B 2219/35044* (2013.01); *G05B 2219/45244* (2013.01); *G06F 2217/41* (2013.01)

(58) Field of Classification Search
   None
   See application file for complete search history.

(56) References Cited

U.S. PATENT DOCUMENTS

| 7,266,469 B1 * | 9/2007 | Tucker, III | G01C 1/00 361/225 |
| 8,571,828 B2 | 10/2013 | Tseng et al. | |
| 2010/0169062 A1 * | 7/2010 | Linn | B29C 45/7693 703/2 |

OTHER PUBLICATIONS

H.-C. Tseng, R.-Y. Chang, and C.-H. Hsu, Phenomenological Improvements to Predictive Models of Fiber Orientation in Concentrated Suspensions, J. Rheol. 57, 1597 (2013).
J. H. Phelps, Processing-Microstructure Models for Short- and Long-Fiber Thermoplastic Composites, University of Illinois at Urbana-Champaign (2009).
J. H. Phelps and C. L. Tucker III, An Anisotropic Rotary Diffusion Model for Fiber Orientation in Short- and Long-Fiber Thermoplastics, J. Non-Newtonian Fluid Mech. 156 165 (2009).

(Continued)

*Primary Examiner* — Sean Shechtman
(74) *Attorney, Agent, or Firm* — WPAT, P.C., Intellectual Property Attorneys; Anthony King

(57) ABSTRACT

A computer-implemented simulation method for use in a molding process comprises steps of specifying a simulating domain corresponding to a genuine domain in a mold disposed on a molding machine, wherein the genuine domain has a mold cavity to be filled with a fluid having fibers from the molding machine in order to prepare a molding product; performing a virtual molding to generate a shear rate distribution of the fluid having the fibers in the simulating domain while using a molding condition for the molding machine; and calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor.

20 Claims, 17 Drawing Sheets

(56) References Cited

OTHER PUBLICATIONS

N. Nguyen, X. Jin, J. Wang, J. H. Phelps, C. L. Tucker III, V. Kunc, S. K. Bapanapalli, and M. T. Smith, Implementation of New Process Models for Tailored Polymer Composite Structures into Processing Software Packages, the U.S. Department of Energy, Pacific Northwest National Laboratory, PNNL Report under Contract DE-AC05-76RL01830 (2010).

G. L. Hand, A Theory of Anisotropic Fluids, J. Fluid Mech. 13, 33 (1962).

* cited by examiner

50

---

Specifying a simulating domain corresponding to a genuine domain in a mold disposed on a molding machine, wherein the genuine domain has a mold cavity to be filled with a fluid having fibers from the molding machine to prepare a molding product ~51

↓

Performing a virtual molding to generate a shear rate distribution of the fluid having the fibers in the simulating domain while using a molding condition for the molding machine ~53

↓

Calculating an orientation distribution of the fibers taking into consideration an anisotropic rotary diffusion effect of the fibers and the shear rate distribution, wherein the anisotropic rotary diffusion effect is determined taking into consideration a square of a rate-of-deformation tensor ~55

↓

Setting the molding machine taking into consideration the molding condition to perform an actual molding to inject the fluid with the fibers into at least a portion of the genuine domain ~57

FIG. 5

COMPUTER-IMPLEMENTED SIMULATION METHOD AND NON-TRANSITORY COMPUTER MEDIUM CAPABLE OF PREDICTING FIBER ORIENTATION FOR USE IN A MOLDING PROCESS

TECHNICAL FIELD

The present disclosure relates to a computer-implemented simulation method and a non-transitory computer medium capable of predicting fiber orientation in a fluid in a molding process performed by a molding machine, and more particular, to a molding-condition setting method of a molding machine for preparation of a fiber-reinforced thermoplastic product.

DISCUSSION OF THE BACKGROUND

Fiber-reinforced thermoplastic (FRT) composites, produced by molding techniques, such as injection molding, greatly reduce assembly costs and vehicle weight. Using FRTs to replace metals continues to show strong growth in automotive industrial products so as to improve specific mechanical properties, including tensile property, thermal expansion, electrical conductivity, and water penetrability. More importantly, these properties are strongly dependent on fiber orientation states. However, fiber orientation behavior regarding the plurality of fibers immersed in a polymeric matrix flowing through a filling mold of an injection process is very complex. Therefore, the model for describing orientation states of fibers is of great importance.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a computer-implemented method and a non-transitory computer medium capable of predicting fiber orientation in a fluid in a molding process performed by a molding machine, and more particular, to a molding-condition setting method of a molding machine for preparation of a fiber-reinforced thermoplastic product.

In accordance with some embodiments of the present disclosure, a computer-implemented simulation method for use in a molding process by a computer processor comprises a step of specifying a simulating domain corresponding to a genuine domain in a mold disposed on a molding machine, wherein the genuine domain has a mold cavity to be filled with a fluid having fibers from the molding machine in order to prepare a molding product; a step of performing a virtual molding to generate a shear rate distribution of the fluid having the fibers in the simulating domain while using a molding condition for the molding machine; and a step of calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor. In some embodiment of the present disclosure, the computer-implemented method further comprises a step of setting the molding machine by taking into consideration the molding condition so as to perform an actual molding for transferring the fluid with the fibers into at least a portion of the genuine domain.

In accordance with some embodiments of the present disclosure, a non-transitory computer medium contains computer instructions stored therein for causing a computer processor to perform operations for use in a molding process simulation, and the operations comprise a step of specifying a simulating domain corresponding to a genuine domain in a mold disposed on a molding machine, wherein the genuine domain has a mold cavity to be filled with a fluid having fibers from the molding machine in order to prepare a molding product; a step of performing a virtual molding to generate a shear rate distribution of the fluid having the fibers in the simulating domain while using a molding condition for the molding machine; and a step of calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor. In some embodiment of the present disclosure, the non-transitory computer medium contains computer instructions for causing the computer processor to perform an operation of setting the molding machine by taking into consideration the molding condition so as to perform an actual molding for transferring the fluid with the fibers into at least a portion of the genuine domain.

The mechanical property of the molding product is correlated with the orientation distribution of the fibers. If the simulated orientation distribution of the fibers with the corresponding mechanical property does not meet the specification of the molding product, the fiber parameters may be adjusted, and another simulation is performed to obtain an updated orientation distribution of the fibers in the fluid while using the adjusted fiber parameters, wherein the fiber parameters include the concentration of the fibers in the fluid, the fiber aspect ratio, and the shape factor.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

FIG. 5 is a flow chart of the computer-implemented method for use in a molding process in accordance with some embodiments of the present disclosure.

DETAILED DESCRIPTION

Figure 1:
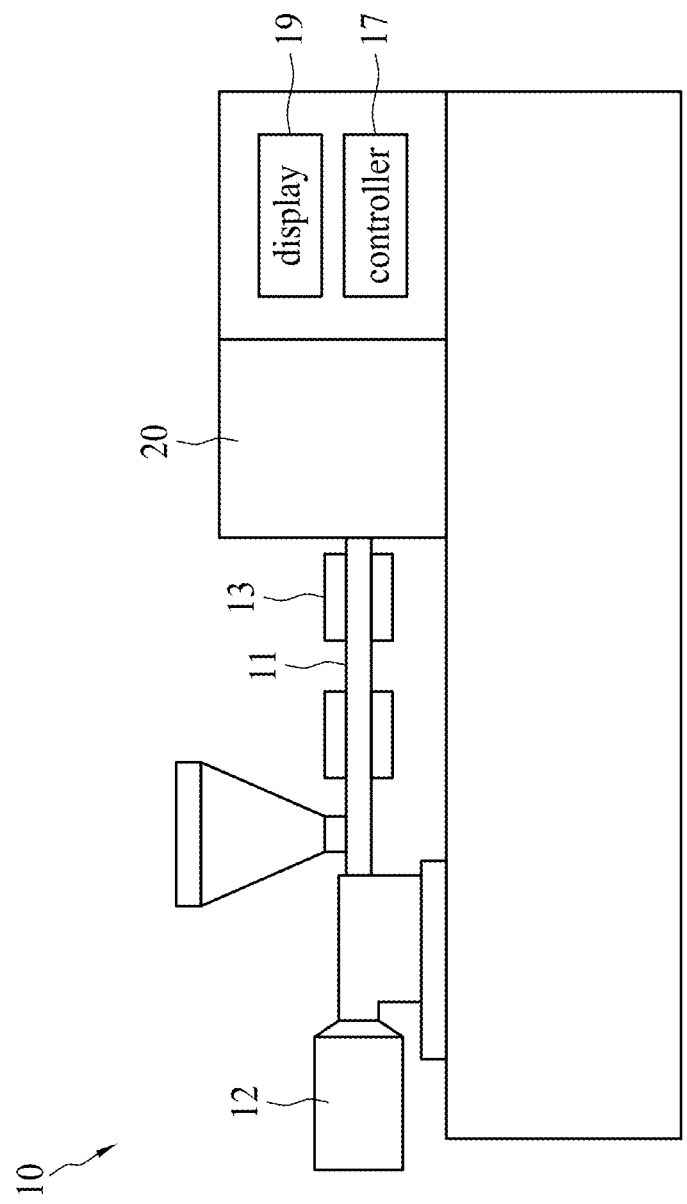
FIG. 1 and FIG. 2 are schematic views of a molding machine equipped with a metal mold in accordance with some embodiments of the present disclosure.

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a computer-implemented method and a non-transitory computer medium capable of predicting fiber orientation in a fluid in a molding process performed by a molding machine. More particularly, the present disclosure is directed to a molding-condition setting method of a molding machine, such as an injection molding machine for preparation of a fiber-reinforced thermoplastic product. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Recently, Phelps and Tucker suggested a two-dimensional diffusion tensor in surface spherical coordinates to derive an anisotropic rotary diffusion (ARD) model of fibers blended in a fluid (see, J. H. Phelps, *Processing-Microstructure Models for Short- and Long-Fiber Thermoplastic Composites*, University of Illinois at Urbana-Champaign (2009), and J. H. Phelps and C. L. Tucker III, *An Anisotropic Rotary Diffusion Model for Fiber Orientation in Short- and Long-Fiber Thermoplastics*, J. Non-Newtonian Fluid Mech. 156 165 (2009)). It is supposed that an ARD tensor is approached as a second-order polynomial tensor-valued function of Hand's tensor, which depends on both an orientation tensor and a rate-of-deformation tensor (see, G. L. Hand, *A Theory of Anisotropic Fluids*, J. Fluid Mech. 13, 33 (1962)). There are five parameters for this ARD tensor. However, their study showed that these parameters are sensitive to likely produce unstable numerical results, and this is not convenient in use.

For describing anisotropic states of fiber orientation, Phelps and Tucker proposed an equation of time derivative orientation tensor $\dot{A}^{PT}$ consisting of both terms, namely, the Jeffery hydrodynamic (HD) $\dot{A}^{HD}$ term and the anisotropic rotary diffusion (ARD) $\dot{A}^{ARD}$ term, as below:

$$\dot{A}^{PT} = \dot{A}^{HD} + \dot{A}^{ARD} \tag{1}$$

$$\dot{A}^{HD} = (W \cdot A - A \cdot W) + \xi(D \cdot A + A \cdot D - 2A_4 : D) \tag{2}$$

$$\dot{A}^{ARD} = \dot{\gamma}[D_r - tr(D_r)A - 5D_r \cdot A - 5A \cdot D_r + 10A_4 : D_r] \tag{3}$$

$$\xi = \frac{a_r^2 - 1}{a_r^2 + 1} \tag{4}$$

where A is the second order orientation tensor, $A_4$ is a fourth order orientation tensor, W is the vorticity tensor, D is the rate-of-deformation tensor, $\xi$ is the shape factor, and $a_r$ is the fiber aspect ratio, i.e., the ratio of fiber length l to fiber diameter d, $a_r = l/d$.

Notably, $D_r$ is an anisotropic rotary diffusion tensor. Phelps and Tucker suggested that $D_r$ approaches a simple form of the Hand's tensor, which is a second-order polynomial tensor-valued function of A and D:

$$D_r = b_1 I + b_2 A + b_3 A^2 + \frac{b_4}{\dot{\gamma}} D + \frac{b_5}{\dot{\gamma}^2} D^2 \tag{5}$$

where I is the identity matrix, and the values of these available parameters, $b_1$, $b_2$, $b_3$, $b_4$, and $b_5$, are fit by experimental data. However, no research has attempted to seriously derive this approach above through a mathematic method, so far. Using such a second-order polynomial to $D_r$ is intuitive thinking without physical meaning. More importantly, controlling too many parameters is not exactly convenient and likely produces unstable numerical results for the general users having no experimental data.

One aspect of the present disclosure is to simplify the five-parameter Hand's tensor to describe the fiber orientation. In other words, the present disclosure provides a solution with a few critical terms mainly handling anisotropic orientation characteristics. It is helpful to understand the relationship between the parameters and fiber orientations. Moreover, a modified ARD model with less parameter of the present disclosure still provides two merits of stable numerical computation and accurate prediction.

Figure 2:
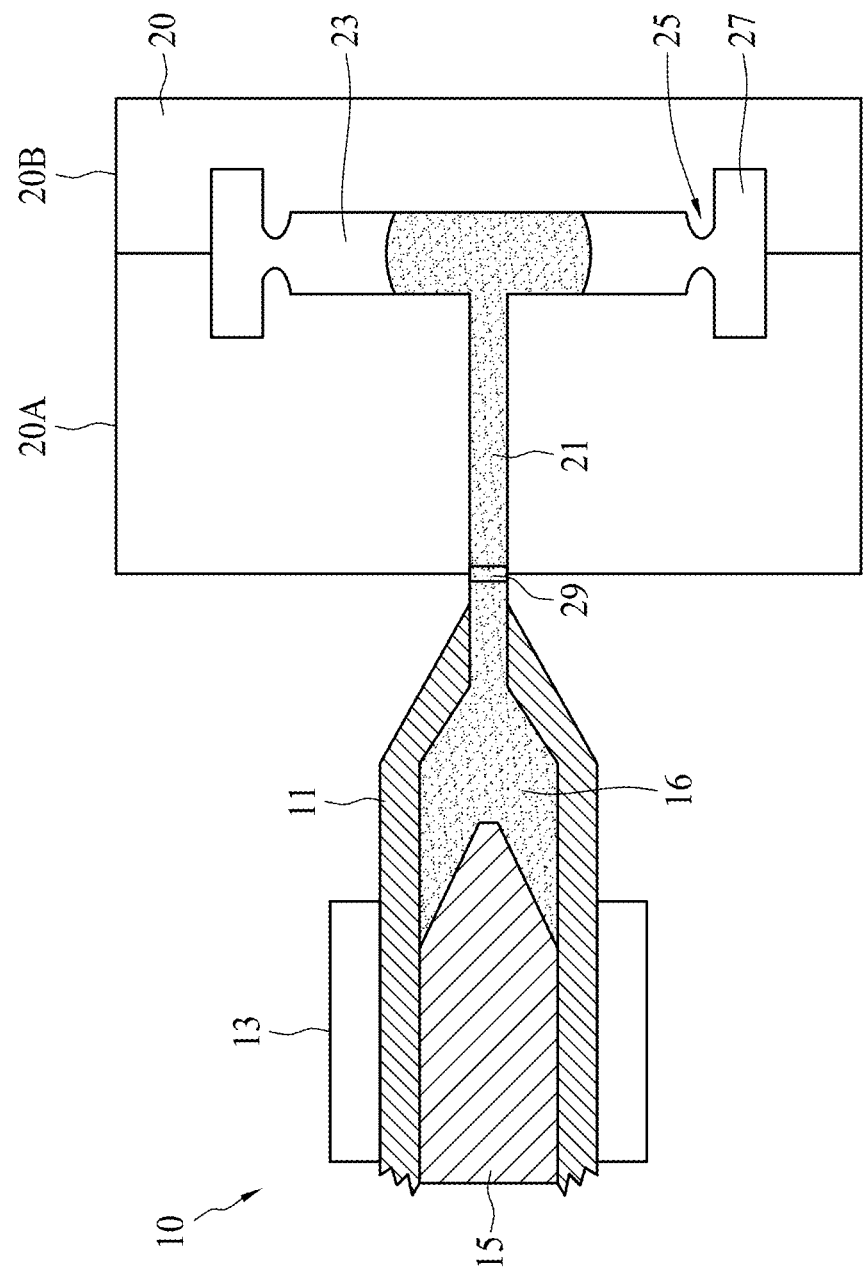

FIG. 1 and FIG. 2 are schematic views of a molding machine 10, such as an injection molding machine equipped with a metal mold 20 in accordance with some embodiments of the present disclosure. The molding machine 10 includes a screw chamber 11, heating elements 13 configured to heat the screw chamber 11, and a screw 15 positioned in the screw chamber 11 and driven by a screw-driving motor 12 for feeding a molding resin 16, such as thermoplastics, into a mold cavity 25 of the metal mold 20. The injection machine 10 has a controller 17 configured to control the operation of the molding machine 10 and a display 19 configured to display information of the injection molding process.

The metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the molding machine 10. The sprue portion 21 of the metal mold 20 is connected to the barrel 11 of the molding machine 10 via a nozzle 29.

FRT composites are grouped into two categories based on fiber length: short fiber-reinforced thermoplastics or SFRTs, with fiber length of about 0.2 to 0.4 mm, and long fiber-reinforced thermoplastics or LFRTs, having fiber length of about 10 to 13 mm. Unlike SFRTs, LFRTs can yield continuous-fiber reinforcement. LFRT pellets are more extensively employed in automotive industrial fabrication than SFRT pellets.

The injection molding technique uses conventional rapid automated molding equipment, and SFRT/LFRT production has been applied using the injection process. In the injection molding process, the additional fiber composites filled in polymer/resin melts (polymeric matrix) are transported as a suspension into the mold cavity 25. To design molding products effectively, the influence of flow-induced fiber orientation distribution on the mechanical properties, such as the strength of the finished molding product, must be considered.

Figure 3:
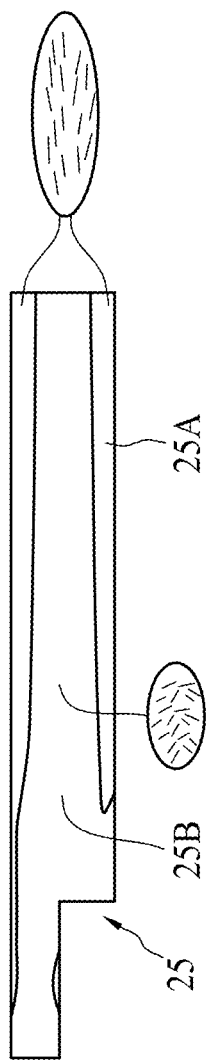
FIG. 3 illustrates the orientation of the fibers filled into the mold cavity in FIG. 1 and FIG. 2.

FIG. 3 illustrates the orientation of the fibers filled into the mold cavity 25. The most noticeable feature of the filling is the existence of a shell region 25A and a core region 25B across the thickness of the molded cavity 25. The fibers found in the shell region 25A (near the cavity wall) are strongly aligned in the flow direction, but the fibers in the core region 25B (near the cavity center) are transverse to the flow. Hence, it is necessary to understand how the fiber orientation varies during the mold filling.

Figure 4:
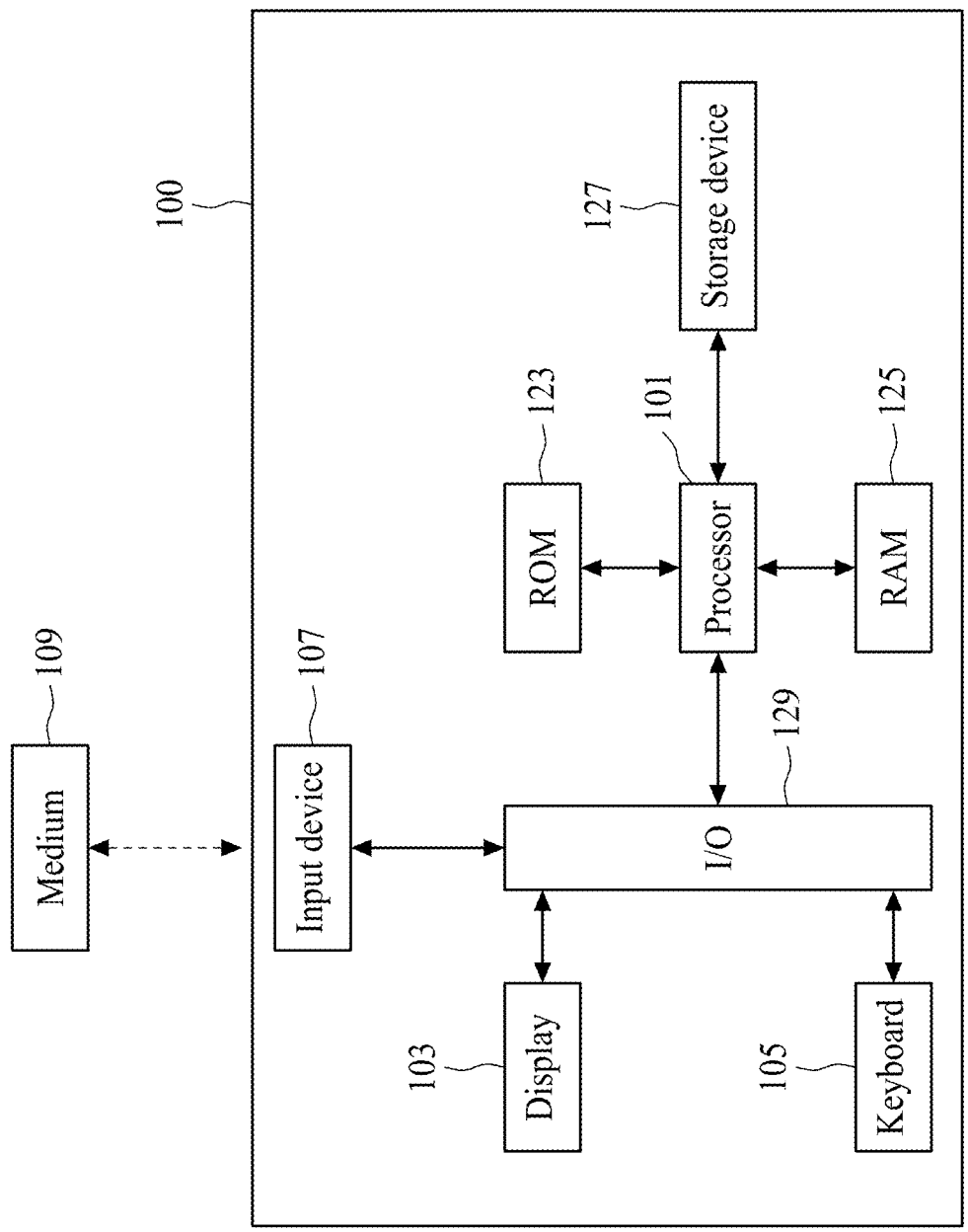
FIG. 4 is a functional block diagram of a computing apparatus in accordance with some embodiments of the present disclosure.

FIG. 4 is a functional block diagram of a computing apparatus 100 in accordance with some embodiments of the present disclosure. In some embodiments of the present disclosure, the computing apparatus 100 comprises a computer processor 101 for performing a computer-implemented injection molding method. In some embodiments of the present disclosure, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a display 103, a keyboard 105, and an input device 107, such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory device, i.e., the ROM 123 and the RAM 125, can be programmed to store codes for performing the computer-implemented method.

FIG. 5 is a flow chart of the computer-implemented simulation method 50 capable of predicting fiber orientation in a fluid in a molding process performed by a molding machine in accordance with some embodiments of the present disclosure. The method comprises a step 51 of specifying a simulating domain corresponding to a genuine domain in a mold disposed on a molding machine, wherein the genuine domain has a mold cavity to be filled with a fluid having fibers from the molding machine so as to prepare a molding product; a step 53 of performing a virtual molding to generate a shear rate distribution of the fluid having the fibers in the simulating domain while using a molding condition for the molding machine; and a step 55 of calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor. In some embodiment of the present disclosure, the computer-implemented simulation method 50 further comprises a step 57 of setting the molding machine by taking into consideration the molding condition to perform an actual molding for injecting the fluid with the fibers into at least a portion of the genuine domain.

In some embodiments of the present disclosure, the injection molding simulation method 50 can begin in the step 51 where the simulating domain is specified. In some embodiments of the present disclosure, the simulating domain is obtained from a CAD (Computer Aided Design) model used in design and development of a molding product.

Figure 6:
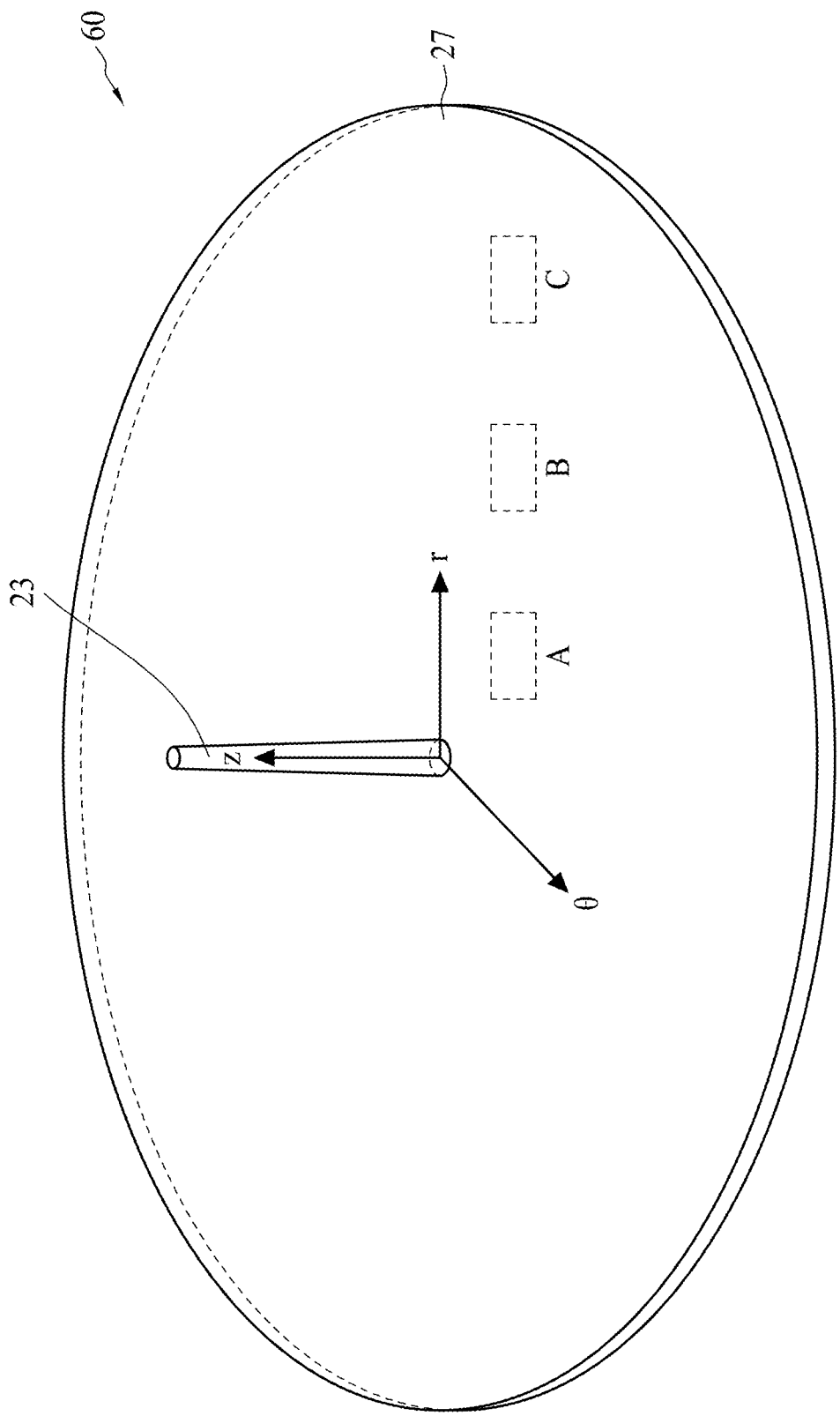
FIG. 6 is a schematic view of a genuine domain in accordance with some embodiments of the present disclosure.

FIG. 6 is a schematic view of a genuine domain 60 in accordance with some embodiments of the present disclosure. Referring back to FIG. 2, the metal mold 20 may be divided into two parts: a metal part and a space part defined by the metal part. The genuine domain 60 is an example of the space part of the metal mold 20.

Figure 7:
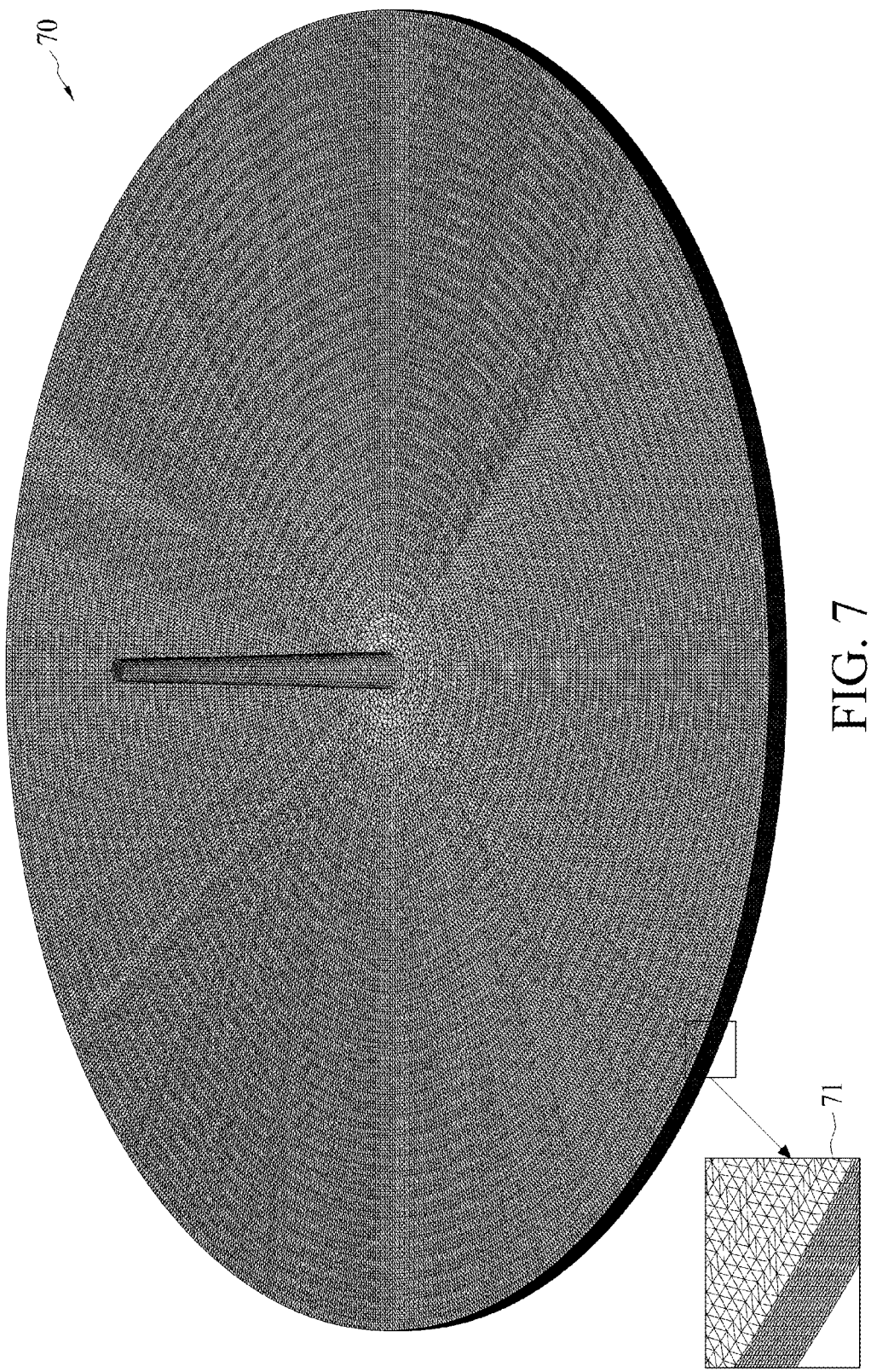
FIG. 7 is a schematic view of a simulating domain corresponding to the genuine domain in accordance with some embodiments of the present disclosure.

FIG. 7 is a schematic view of a simulating domain 70 corresponding to the genuine domain 60 in accordance with some embodiments of the present disclosure. In some embodiments of the present disclosure, a mesh is created by dividing at least part of the simulating domain 70 before actually applying a numerical analysis, such as an FEM (finite element method), an FDM (finite difference method) or an FVM (finite volume method), to the simulating domain 70. The creation of the mesh for the simulating domain 70 uses a technique of modeling an object or fluid region (i.e., the simulating domain 70 of the present embodiment) to be analyzed with a set of elements 71, such as rectangular mesh, hexahedral mesh or tetrahedral mesh, in order to perform the subsequent numerical analysis.

In step 53, to generate a shear rate distribution of the fluid having the fibers, a virtual molding process is performed to simulate a molding process of a molding resin that is injected into the simulating domain while using a molding condition for the molding machine, wherein the molding condition includes the mold temperature, resin temperature, injection pressure, injection time (or speed), packing pressure, packing time, and so on. The molding phenomena of the molding material 16 can be simulated by using the following governing equations (6)-(9):

$$\frac{\partial \rho}{\partial t} + \nabla \cdot \rho u = 0 \quad (6)$$

$$\frac{\partial}{\partial t}(\rho u) + \nabla \cdot (\rho u u + \tau) = -\nabla p + \rho g \quad (7)$$

$$\frac{\partial}{\partial t}(T\rho C_P) + \nabla \cdot (\rho u C_P T) = k\nabla^2 T + \eta\dot{\gamma}^2 \quad (8)$$

$$\tau = -\eta(T,\dot{\gamma})(\nabla u + \nabla u^T) \quad (9)$$

where ρ represents the density, t represents the time, u represents the velocity vector (flow velocity), τ represents the total stress tensor, p represents the pressure, g represents the gravity vector, T represents the temperature, $C_P$ represents the specific heat, k represents the thermal conductivity, η represents the viscosity, and $\dot{\gamma}$ represents the shear rate.

Solving the governing equations (6)-(9) requires a transient state analysis, which can be performed numerically by using a computer. See, for example, Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference. During the transient state analysis, the process variables that change with time are not zero; i.e., the partial derivatives (∂/∂t) in the governing equations (6)-(9) are not considered zero.

Figure 8:
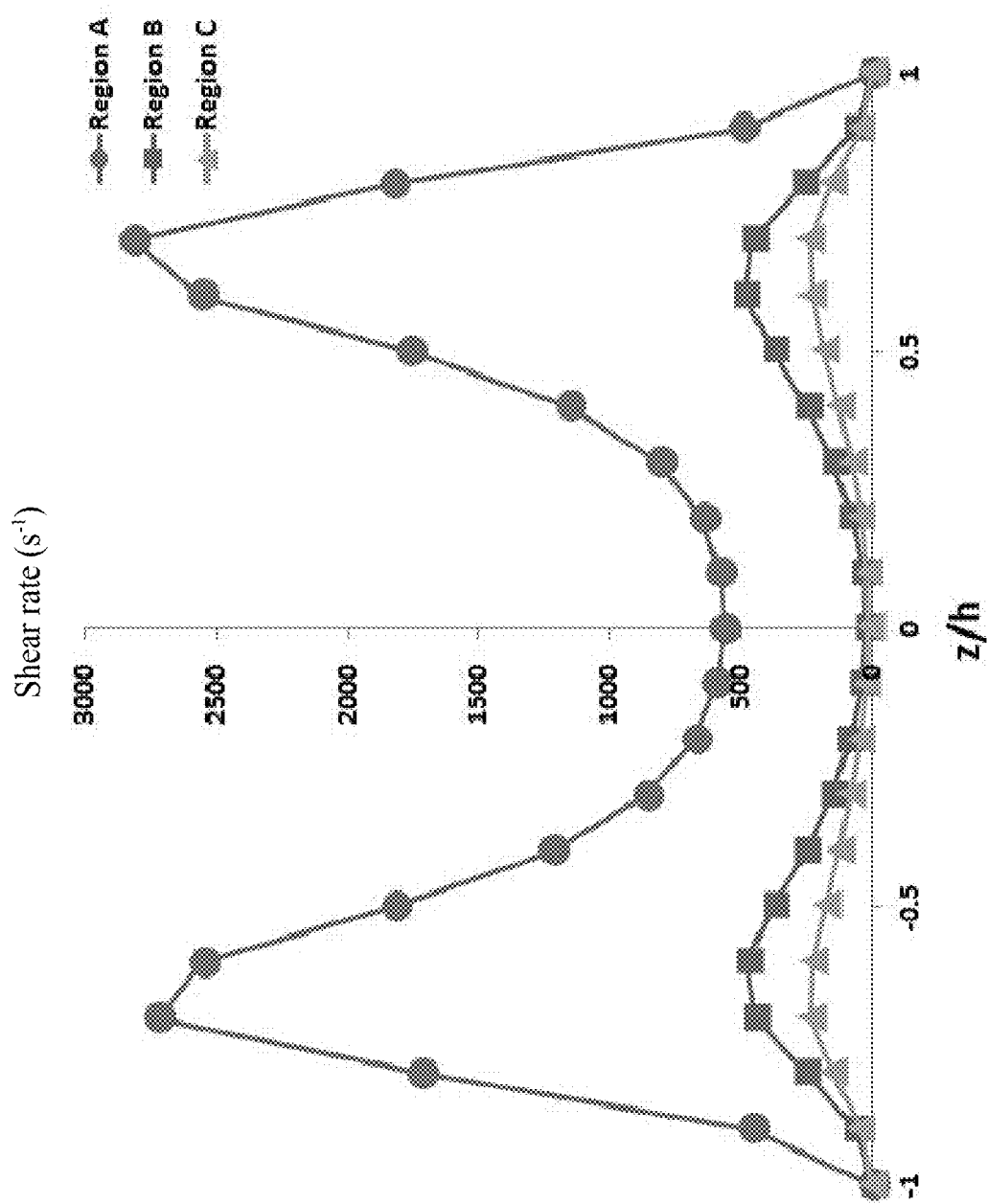
FIG. 8 shows the shear rate distribution of the fluid with the fibers transferred into the simulating domain through the normalized thickness z/h from the transient state analysis in accordance with some embodiments of the present disclosure.

FIG. 8 shows the shear rate distribution of the fluid with the fibers injected into the simulating domain 70 through the normalized thickness z/h from the transient state analysis in accordance with some embodiments of the present disclosure. The shear rate distribution through the thickness is measured at three regions of A, B, and C, along the radial direction of the disk. In some embodiments of the present disclosure, the shear rate is correlated with the velocity gradient tensor, and the shear rate distribution can be obtained from the following expressions:

$$\dot{\gamma} = \sqrt{2D:D} \quad (10)$$

$$D = \frac{L + L^T}{2} \quad (11)$$

where L=∇u is the velocity gradient tensor, $L^T$ is a transpose matrix of L, and D is the rate-of-deformation tensor. The shear rate is the double dot product of the rate-of-deformation tensor.

In step 55, the orientation distribution of the fibers is calculated by taking into consideration an anisotropic rotary diffusion effect of the fibers and the shear rate distribution (or the velocity gradient tensor), wherein the anisotropic rotary diffusion effect is determined by taking into consideration a square of a rate-of-deformation tensor.

One aspect of the present disclosure is to reduce the conventional inconvenient five-parameter of the ARD tensor to a tensor with a lesser two-parameter. Previously, our disclosure (see U.S. Pat. No. 8,571,828 and H.-C. Tseng, R.-Y. Chang, and C.-H. Hsu, Phenomenological Improvements to Predictive Models of Fiber Orientation in Concentrated Suspensions, J. Rheol. 57, 1597 (2013), and the entirety of which is herein incorporated by reference) which proposed an improved ARD (iARD) tensor to describe anisotropic states of fiber orientation, as below:

$$D_r = C_I(I - C_M \tilde{L}) \quad (12)$$

$$\tilde{L} = \frac{L^T \cdot L}{L^T : L} \quad (13)$$

where $\tilde{L}$ is a dimensionless flow-resistance tensor; two parameters $C_I$ and $C_M$ represent the fiber-fiber interaction and the fiber-matrix interaction, respectively.

In our previous work, the iARD tensor approaches the ARD tensor from numerical validation. Recently, we continued to deeply investigate what an objective form of $\tilde{L}$ is. Consequently, one outcome is obtained, namely that $\tilde{L}$ is related to the square of the rate-of-deformation tensor, namely, $D^2$. Suppose that $$\tilde{L} = \frac{D^2}{\|D^2\|} \quad (14)$$

where $$\|D^2\| = \sqrt{\frac{1}{2}D^2:D^2}$$

is the norm of $D^2$.

Accordingly, the iARD tensor with an objective property can be represented using an expression:

$$D_r = C_I\left(I - C_M \frac{D^2}{\|D^2\|}\right) = C_I I - C_I C_M \frac{D^2}{\|D^2\|} \quad (15)$$

Note that $$\|D^2\| = \frac{1}{4}\dot{\gamma}^2$$

for a simple shear flow with an imposed shear rate $\dot{\gamma}$. Thus, this equation form of the iARD tensor is equivalent to the original ARD tensor of Equation (5), where non-zero-value parameters are $b_1 = C_I$ and $b_5 = -4C_I C_M$; and zero-value parameters are $b_2 = 0$, $b_3 = 0$, and $b_4 = 0$. In short, the iARD tensor $D_r$ for describing the anisotropic rotary diffusion effect is related only to the square of the rate-of-deformation tensor and the identity matrix. In other words, the anisotropic rotary diffusion effect is determined without taking into consideration of the second order orientation tensor and the square of the second order orientation tensor according to the present disclosure.

In some embodiment of the present disclosure, the anisotropic rotary diffusion effect is represented using an expression having a first parameter ($C_I$) and a second parameter ($-C_I C_M/\|D^2\|$), an increasing of the first parameter decreases a fiber alignment degree (flow component $A_{11}$) and an increasing of the second parameter increases a fiber alignment degree.

In some embodiment of the present disclosure, the two-parameters iARD tensor expression (15) with objective property can be implemented by simplifying the five-parameter second-order polynomial tensor-valued function (5) of A and D:

$$D_r = b_1 I + b_2 A + b_3 A^2 + \frac{b_4}{\dot{\gamma}} D + \frac{b_5}{\dot{\gamma}^2} D^2 \qquad (5)$$

wherein I represents an identity matrix, A represents a second order orientation tensor, and D represents the rate-of-deformation tensor. The simplifying of the second-order polynomial tensor-valued function comprises setting $b_2=0$, $b_3=0$, and $b_4=0$, and setting $b_1=C_I$ and $b_5=-4C_I C_M$, wherein $C_I$ and $C_M$ represent a fiber-fiber interaction and a fiber-matrix interaction, respectively.

In particular, the molding product may have all kind of shapes, wherein different coordinate systems are used to specify the genuine domain and simulating domain of the molding product, and the computer-implemented simulation method should be independent of the coordinate system. Due to the use of the iARD tensor with an objective property, which is independent of the coordinate system, the present disclosure can be applied to the molding product having a variety of shapes.

In step 57, if the simulated orientation distribution of the fibers meets the specification of the molding product, then the molding condition is used to set the molding machine to perform an actual molding for injecting the fluid with the fibers into at least a portion of the genuine domain while taking into consideration the molding condition. In other words, the present disclosure can be considered a molding-condition setting method of a molding machine for preparation of a fiber-reinforced thermoplastic product.

There are several embodiments below to show the present disclosure is valid for the two-parameter ARD tensor. Referring to the original ARD tensor of Phelps' Ph.D. thesis, the 40 wt % long glass-fiber immersed in polypropylene matrix (40 wt % LGF/PP) in an analytical simple-shear velocity field was examined to predict variation in orientation tensor components (flow component $A_{11}$ and cross-flow component $A_{22}$) with respect to shear strain. Table I lists both the conventional five-parameter and the present two-parameter values of the ARD tensor.

TABLE I

ARD tensor parameter for 40 wt % LGF/PP.

| | five-parameter | two-parameter |
|---|---|---|
| $b_1$ | $3.842 \times 10^{-4}$ | 0.025 |
| $b_2$ | $-1.786 \times 10^{-3}$ | 0 |
| $b_3$ | $5.250 \times 10^{-2}$ | 0 |
| $b_4$ | $1.168 \times 10^{-5}$ | 0 |
| $b_5$ | $-5.000 \times 10^{-4}$ | $-0.1$ |

Figure 9:
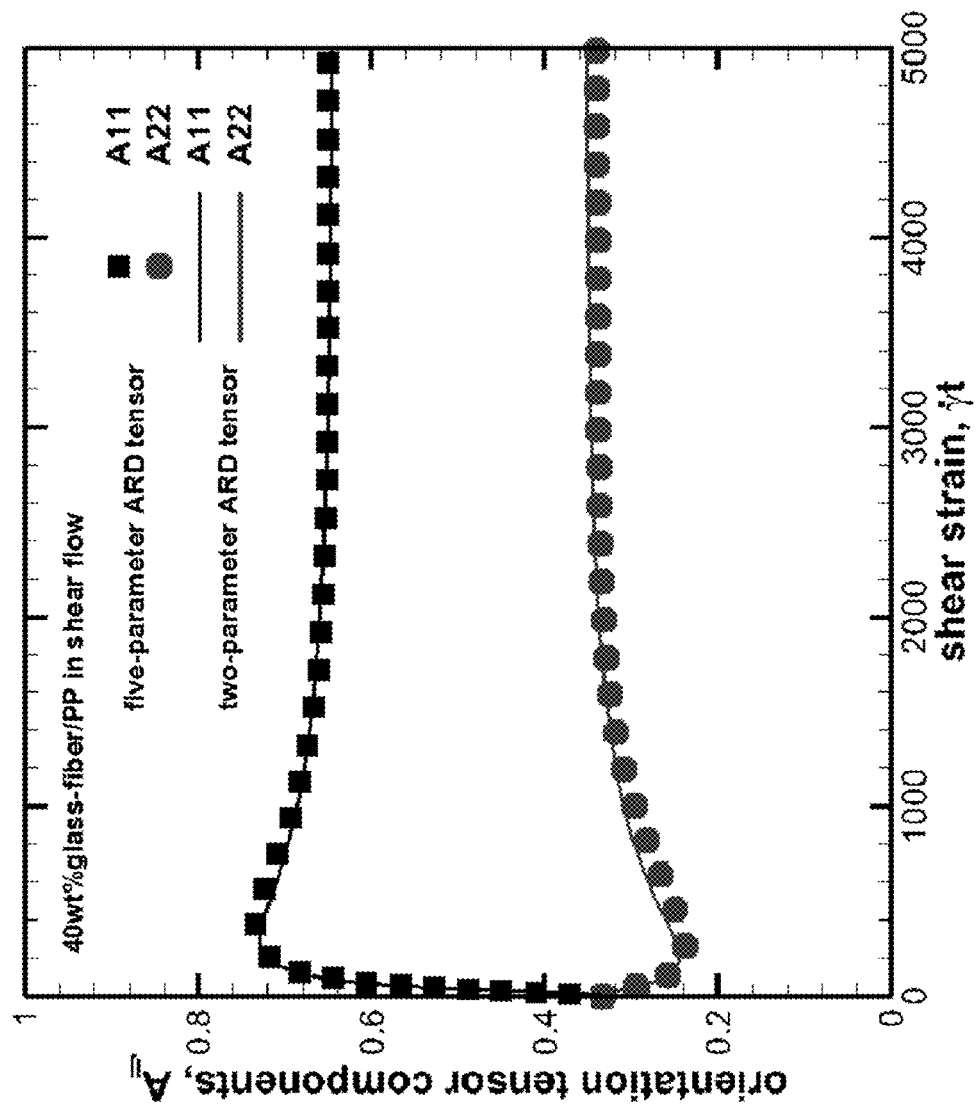
FIG. 9 shows the $A_{11}$ and $A_{22}$ changes wherein the square symbols and the solid lines indicate the five-parameter and two-parameter ARD tensors, respectively.

FIG. 9 shows the $A_{11}$ and $A_{22}$ changes wherein the square symbols and the solid lines indicate the five-parameter and two-parameter ARD tensors, respectively. It is clearly observed that these symbols almost fall in the lines. The two-parameter ARD tensor of the present disclosure is in good agreement with the conventional five-parameter ARD tensor.

Figure 10:
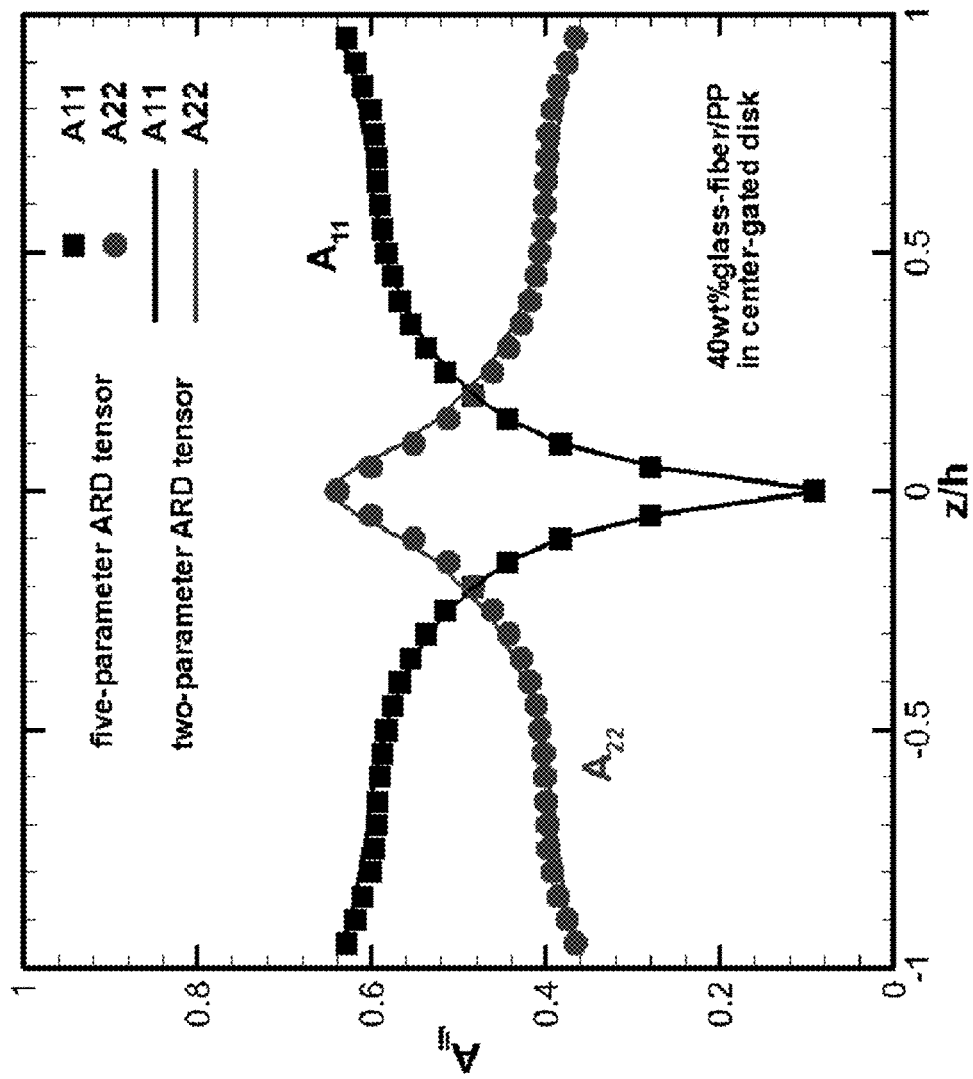
FIG. 10 shows the $A_{11}$ and $A_{22}$ distribution through the normalized thickness.

Furthermore, the same parameter-value of the 40 wt % LGF/PP material in an analytical center-gated-disk velocity field of the Newtonian fluid was performed. FIG. 10 shows the $A_{11}$ and $A_{22}$ distribution through the normalized thickness. The same to the shear flow phenomena described in FIG. 9, the present two-parameter ARD tensor closely matches the conventional five-parameter ARD tensor. Therefore, the above results firmly support the validity of the two-parameter ARD tensor of the present disclosure.

Figure 11:
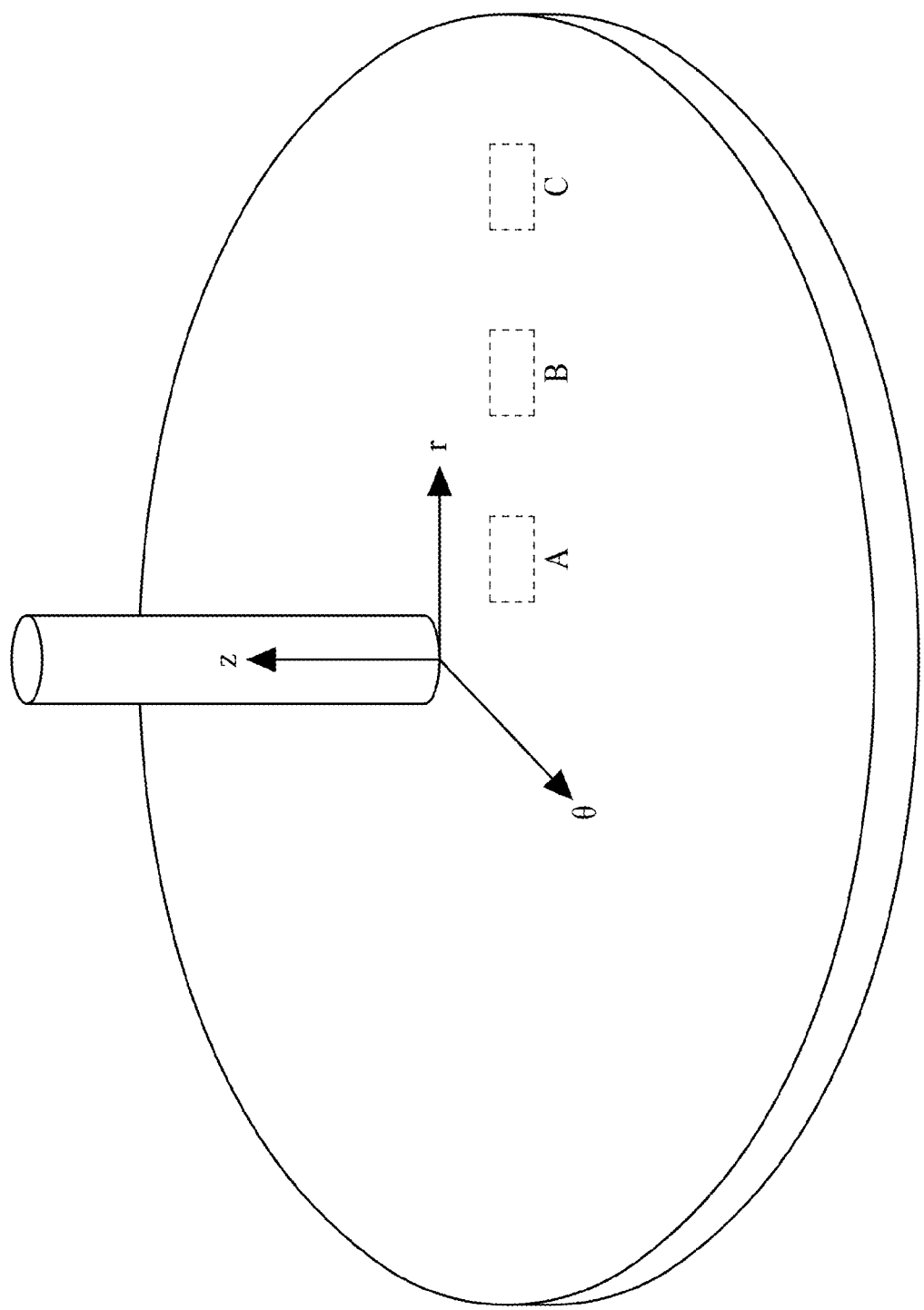
FIG. 11 shows the geometry of center-gated disks of mold filling.

A center-gated disk provides a more extensive test of a mold filling, as shown in FIG. 11. Here, r describes the flow or radial direction, θ is the cross-flow or tangential direction, and z is the through-thickness direction. According to the present disclosure, the same parameter value of $b_1$ and $b_5$ in Table I for the 40 wt % LGF/PP component is used. Experimental data of fiber orientation tensor components was performed by the PNNL-ORNL team (see, N. Nguyen, X. Jin, J. Wang, J. H. Phelps, C. L. Tucker III, V. Kunc, S. K. Bapanapalli, and M. T. Smith, *Implementation of New Process Models for Tailored Polymer Composite Structures into Processing Software Packages*, the U.S. Department of Energy, Pacific Northwest National Laboratory, PNNL Report under Contract DE-AC05-76RL01830 (2010)).

Note that the disk is 177.8 mm in diameter with a thickness of 2h=3 mm. The Regions A, B, and C are located at 6, 34, and 64 mm in the radial direction, respectively. The material used is the 40 wt % LGF/PP component. The material properties, including rheological and thermal properties, are available in the PNNL Report. The mold temperature was held to approximately 70° C., while the inlet temperature was 238° C. A volume flow rate is about 118 cm$^3$/sec with a filling time of 0.65 sec.

Figure 12:
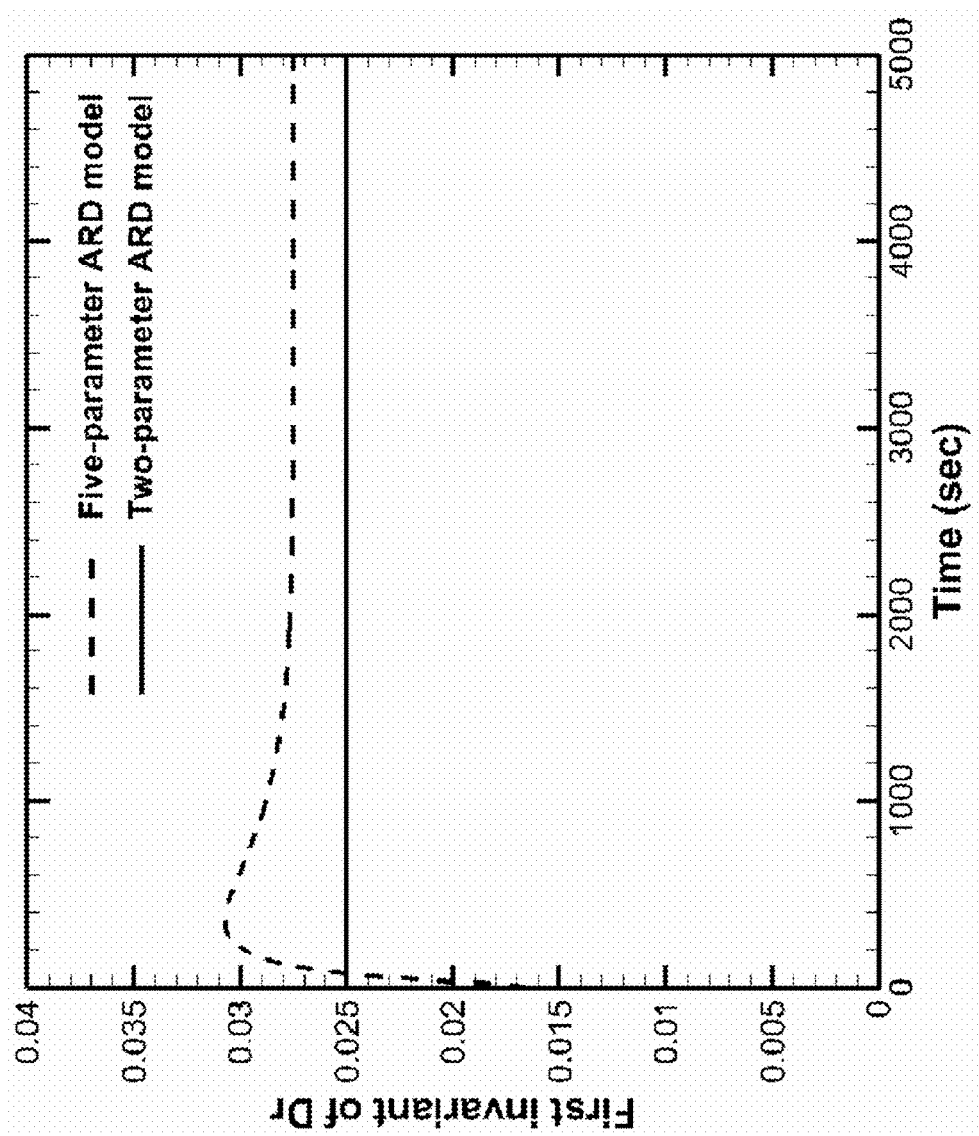
FIG. 12 shows the variation in a first invariant with shear strain under the simple-shear flow and FIG. 13 shows the first invariant distribution through the normalized thickness under the center-gated-disk flow for the five-parameter and two-parameter ARD tensors.
Figure 13:
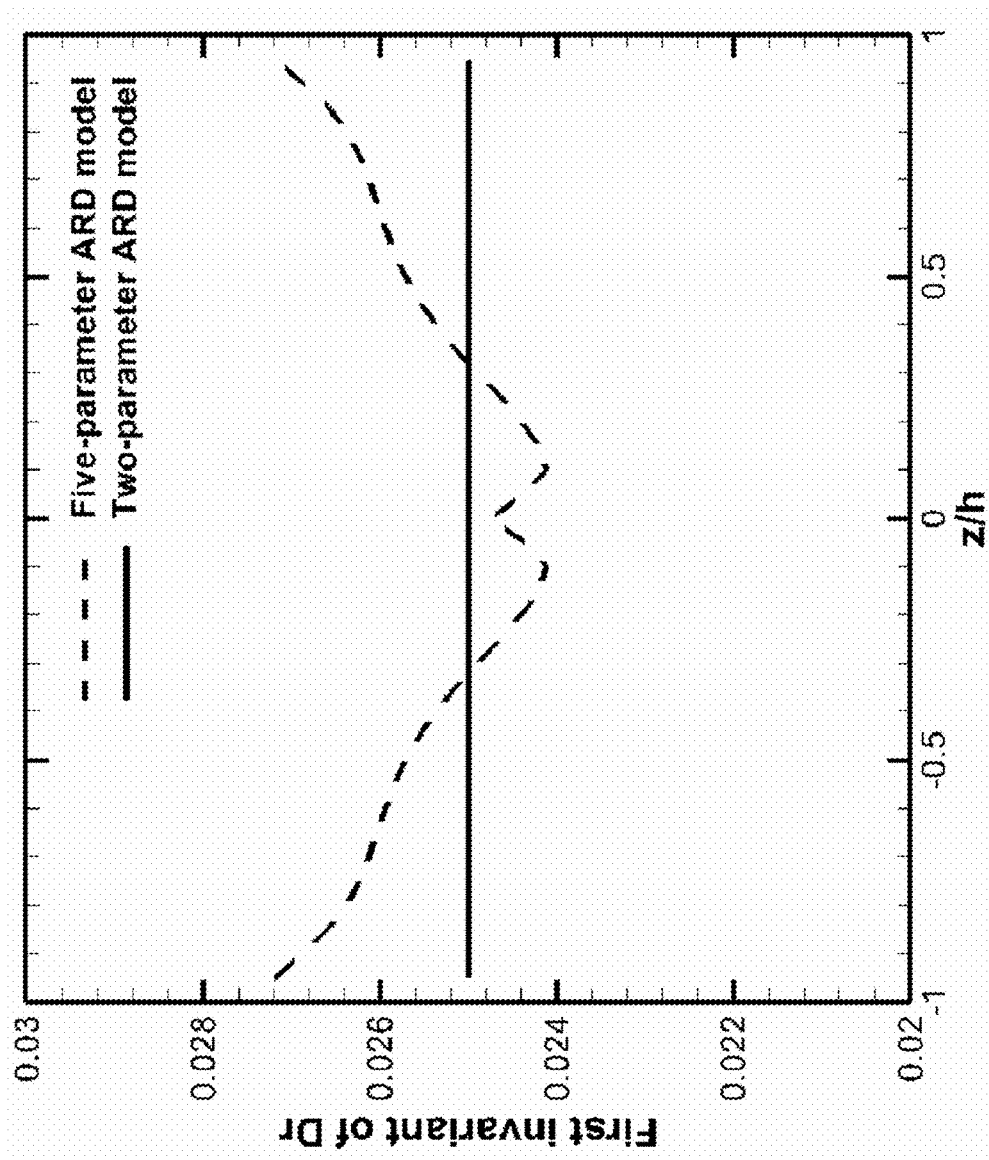

FIG. 12 shows the variation in first invariant with shear strain under the simple-shear flow and FIG. 13 shows the first invariant distribution through the normalized thickness under the center-gated-disk flow for the five-parameter and two-parameter ARD tensors. In order to understand a difference between both the five-parameter and the two-parameter ARD models, the ARD tensor's first invariant is computed, namely, the trace of the tensor or summary of the tensor components. FIGS. 12-13 show changes of first invariant for simple shear flow and center-gated-disk flow. Finding the variation with time and shear rate for the five-parameter tensor is obvious, while the two-parameter tensor is independent upon time and shear rate.

Figure 14:
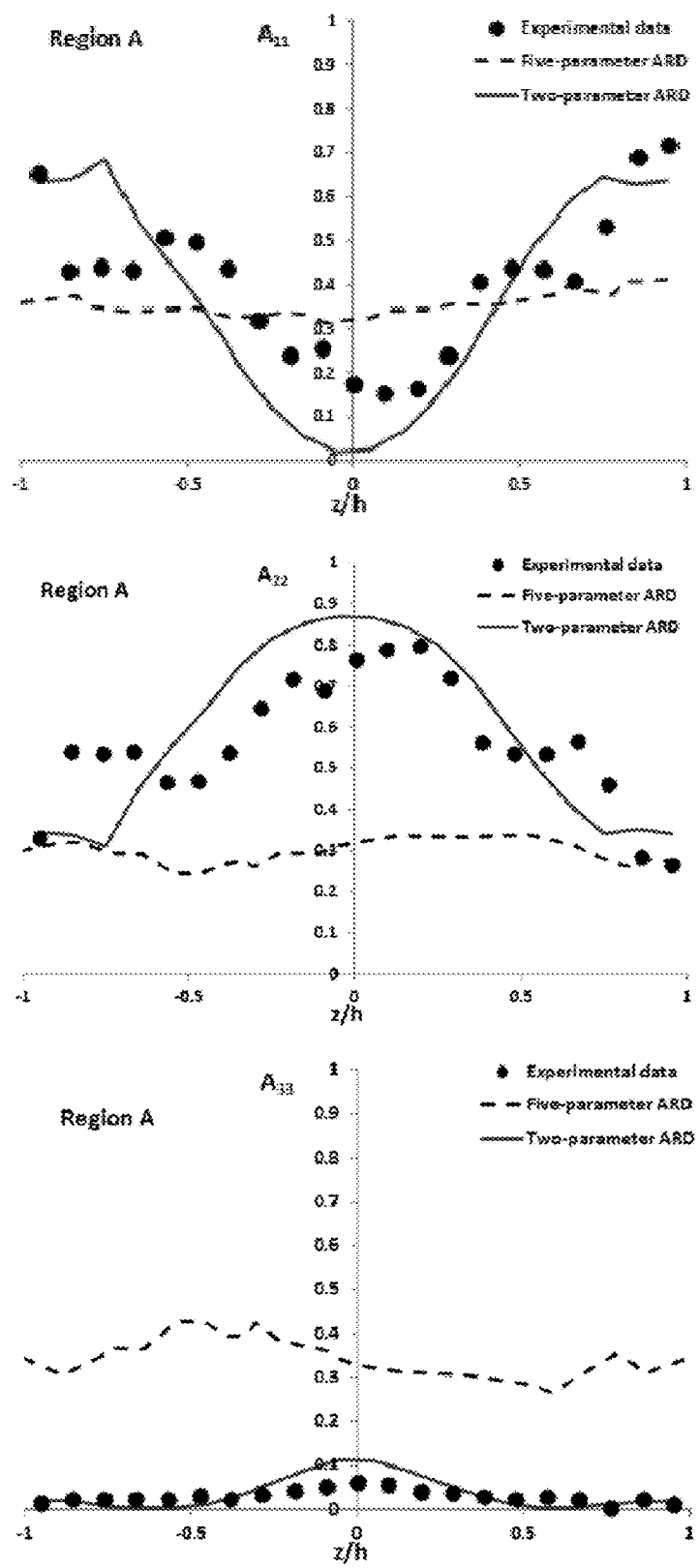
FIGS. 14-16 show the predicted gap-wise distribution of fiber orientation tensor components, $A_{11}$, $A_{22}$, and $A_{33}$, at Regions A, B, and C, respectively.
Figure 15:
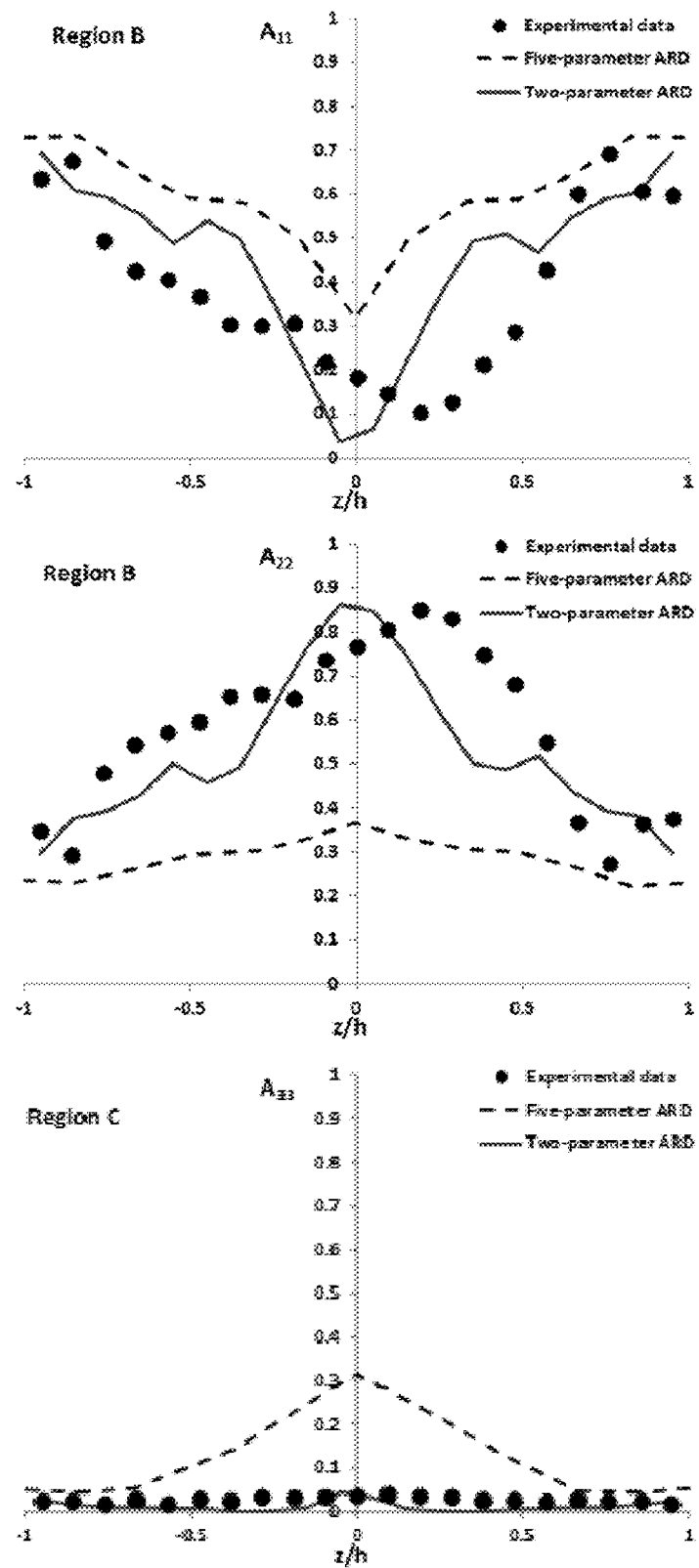
Figure 16:
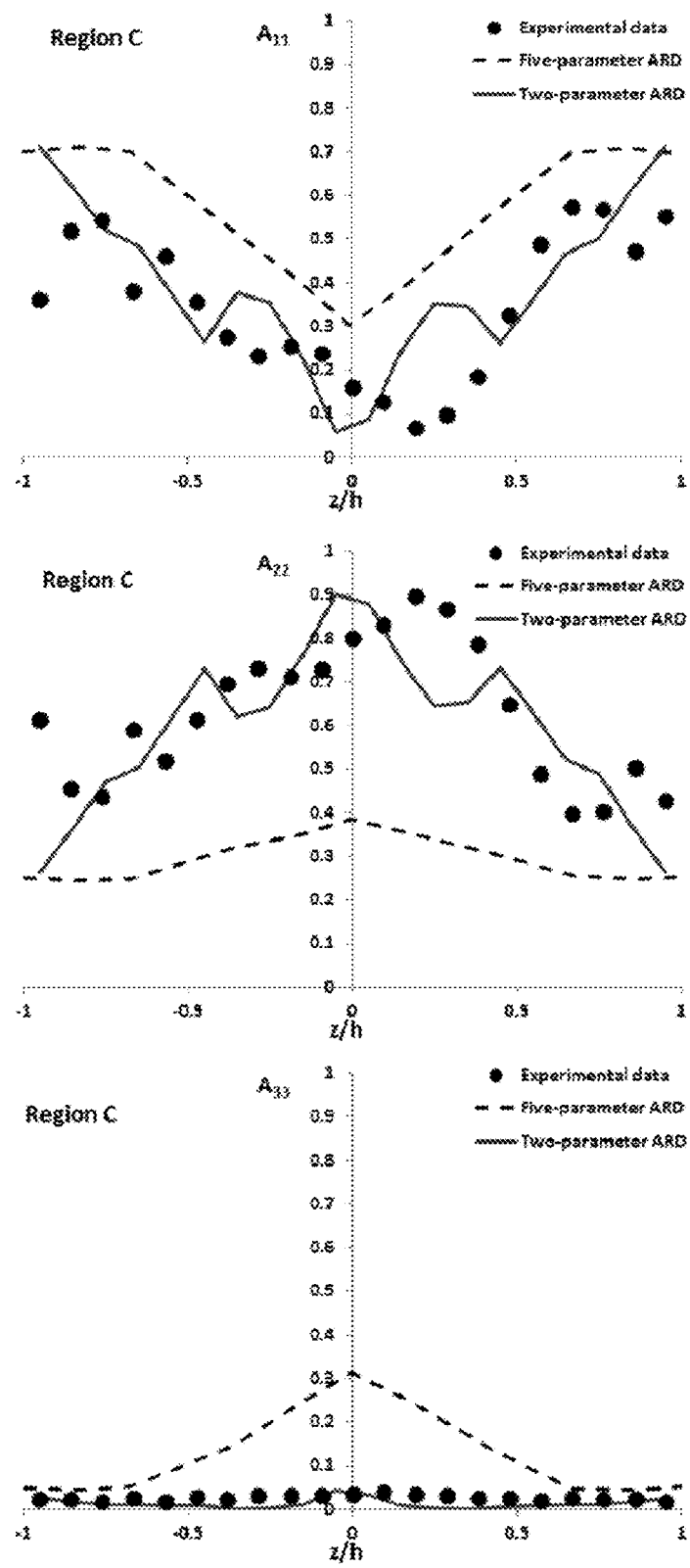

As a result, FIGS. 14-16 show the predicted gap-wise distribution of fiber orientation tensor components, $A_{11}$, $A_{22}$, and $A_{33}$, at Regions A, B, and C, respectively. The important orientation descriptors are the orientation tensor components in which $A_{11}$, $A_{22}$, and $A_{33}$ correspond to the flow, the cross-flow, and the thickness directions, respectively. The predicted lines are in excellent agreement with the experimental data. In addition, these predictions exhibit the significant fiber shell-core structure. This shows an effective ability to predict anisotropic orientation states of long fiber reinforced thermoplastics in injection molding.

Figure 17:
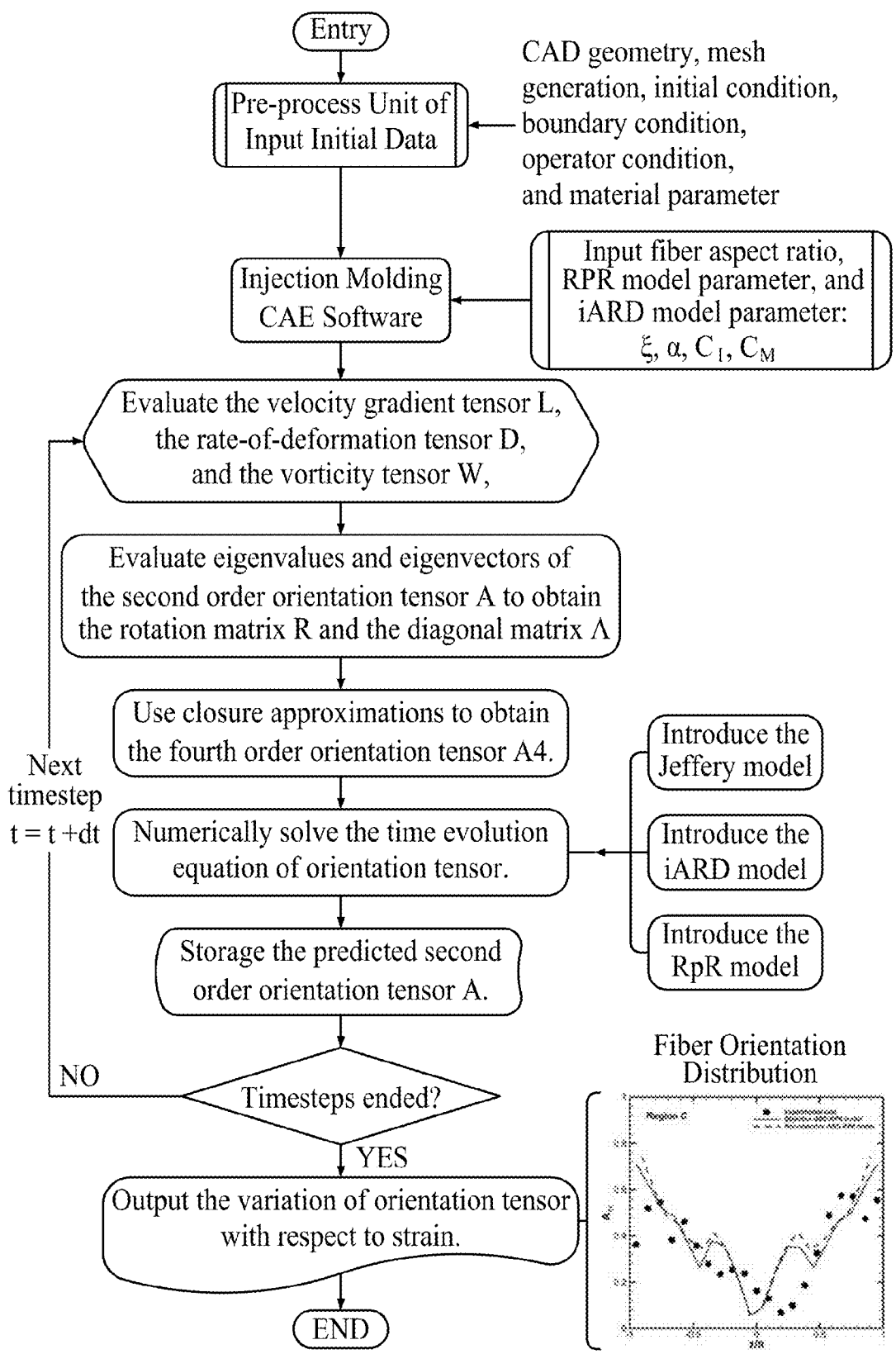
FIG. 17 is a flowchart showing an integration of the fiber orientation prediction technique and the CAE software in accordance with some embodiments of the present disclosure.

FIG. 17 is a flowchart showing an integration of the fiber orientation prediction technique and the CAE software in accordance with some embodiments of the present disclosure. As shown in FIG. 15, the CAE software for injection molding can offer a velocity gradient tensor in the filling flow field for the subsequent fiber-orientation analysis. Thus, the orientation analysis is able to determine an acceptable orientation tensor. It is important that the constitutive equation for fibers obtains the orientation tensor to calculate the fiber suspension stress tensor. In the next step, this stress tensor is returned to the CAE software for updating. Therefore, in future work, the embodiment of the fiber orientation program will play an important role and is helpful in present CAE development of injection molding for fiber reinforced composites.

The mechanical property of the molding product is correlated with the orientation distribution of the fibers. If the simulated orientation distribution of the fibers with the corresponding mechanical property does not meet the specification of the molding product, the fiber parameters and/or the molding condition may be adjusted, and another simulation is performed to obtain an updated orientation distribution of the fibers in the fluid while using the adjusted fiber parameter and/or the molding condition, wherein the fiber parameters include the concentration of the fibers in the fluid, the fiber aspect ratio, and the shape factor.

In some embodiment of the present disclosure, an optimal orientation distribution of the fibers can be obtained by the following steps of performing a first virtual molding to generate a first shear rate distribution (or velocity gradient tensor) while using a first fiber parameter; calculating a first orientation distribution of the fibers in the fluid while using the first shear rate distribution; obtaining a first mechanical property of the molding product by taking into consideration the first orientation distribution; performing a second virtual molding to generate a second shear rate distribution while using a second fiber parameter by taking into consideration the first orientation distribution of the fibers; calculating a second orientation distribution of the fibers in the fluid while using the second shear rate distribution; and obtaining a second mechanical property of the molding product by taking into consideration the second orientation distribution.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented simulation method for use in a molding process by a computer processor, comprising steps of:
specifying a simulating domain corresponding to a genuine domain in a mold disposed on a molding machine, wherein the genuine domain has a mold cavity to be filled with a fluid having fibers from the molding machine in order to prepare a molding product;
performing a virtual molding to generate a shear rate distribution of the fluid having the fibers in the simulating domain while using a molding condition for the molding machine; and
calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor.

2. The computer-implemented simulation method of claim 1, further comprising a step of setting the molding machine by taking into consideration the molding condition to perform an actual molding so as to transfer the fluid with the fibers into at least a portion of the genuine domain.

3. The computer-implemented simulation method of claim 1, comprising:
performing a first virtual molding to generate a first shear rate distribution while using a first parameter of the fibers in the fluid;
calculating a first orientation distribution of the fibers in the fluid while using the first shear rate distribution;
obtaining a first mechanical property of the molding product by taking into consideration the first orientation distribution;
performing a second virtual molding to generate a second shear rate distribution while using a second parameter of the fibers in the fluid by taking into consideration the first orientation distribution of the fibers;
calculating a second orientation distribution of the fibers in the fluid while using the second shear rate distribution; and
obtaining a second mechanical property of the molding product by taking into consideration the second orientation distribution.

4. The computer-implemented simulation method of claim 1, wherein the anisotropic rotary diffusion effect is represented using an expression:

$$D_r = f(\tilde{L});$$

$$\tilde{L} = \frac{D^2}{\|D^2\|};$$

$$\|D^2\| = \sqrt{\frac{1}{2} D^2 : D^2};$$

wherein $D_r$ represents an anisotropic rotary diffusion tensor; $\tilde{L}$ represents a second order symmetric tensor; and $D^2$ represents the square of the rate-of-deformation tensor.

5. The computer-implemented simulation method of claim 1, wherein the anisotropic rotary diffusion effect is represented using an expression:

$$D_r = C_I I - C_I C_M \frac{D^2}{\|D^2\|};$$

wherein I represents an identity matrix; $D^2$ represents the square of the rate-of-deformation tensor; and $C_I$ and $C_M$ represent a fiber-fiber interaction and a fiber-matrix interaction, respectively.

6. The computer-implemented simulation method of claim 1, wherein the anisotropic rotary diffusion effect is represented using an expression having a first parameter and a second parameter, an increasing of the first parameter decreases a fiber alignment degree and an increasing of the second parameter increases a fiber alignment degree.

7. The computer-implemented simulation method of claim 1, wherein the anisotropic rotary diffusion effect is represented using a two-parameter tensor equation, and obtaining the two-parameter tensor equation comprises:

obtaining a tensor-valued function using an expression:

$$D_r = b_1 I + b_2 A + b_3 A^2 + \frac{b_4}{\dot{\gamma}} D + \frac{b_5}{\dot{\gamma}^2} D^2;$$

wherein I represents an identity matrix, A represents a second order orientation tensor, and D represents the rate-of-deformation tensor;

setting $b_2=0$, $b_3=0$, and $b_4=0$;

setting $b_1=C_I$ and $b_5=-4C_I C_M$, wherein $C_I$ and $C_M$ represent a fiber-fiber interaction and a fiber-matrix interaction, respectively.

8. The computer-implemented simulation method of claim 1, wherein the anisotropic rotary diffusion effect is determined without taking into consideration a second order orientation tensor.

9. The computer-implemented simulation method of claim 8, wherein the anisotropic rotary diffusion effect is determined without taking into consideration the square of the second order orientation tensor.

10. The computer-implemented simulation method of claim 1, the calculating the orientation distribution of the fibers is performed by taking into consideration the anisotropic rotary diffusion effect of the fibers and the shear rate distribution when the fluid is transferred into the mold cavity from the molding machine.

11. A non-transitory computer medium containing computer instructions stored therein for causing a computer processor to perform operations for use in a molding process simulation, the operations comprising steps of:

specifying a simulating domain corresponding to a genuine domain in a mold disposed on a molding machine, wherein the genuine domain has a mold cavity to be filled with a fluid having fibers from the molding machine to prepare a molding product;

performing a virtual molding to generate a shear rate distribution of the fluid having the fibers in the simulating domain while using a molding condition for the molding machine; and calculating an orientation distribution of the fibers by taking into consideration an anisotropic rotary diffusion effect of the fibers and the shear rate distribution, wherein the anisotropic rotary diffusion effect is determined by taking into consideration a square of a rate-of-deformation tensor.

12. The non-transitory computer medium of claim 11, further comprising a step of setting the molding machine by taking into consideration the molding condition to perform an actual molding so as to transfer the fluid with the fibers into at least a portion of the genuine domain.

13. The non-transitory computer medium of claim 11, comprising:

performing a first virtual molding to generate a first shear rate distribution while using a first parameter of the fibers in the fluid;

calculating a first orientation distribution of the fibers in the fluid while using the first shear rate distribution;

obtaining a first mechanical property of the molding product by taking into consideration the first orientation distribution;

performing a second virtual molding to generate a second shear rate distribution while using a second parameter of the fibers in the fluid by taking into consideration the first orientation distribution of the fibers;

calculating a second orientation distribution of the fibers in the fluid while using the second shear rate distribution; and obtaining a second mechanical property of the molding product by taking into consideration the second orientation distribution.

14. The non-transitory computer medium of claim 11, wherein the anisotropic rotary diffusion effect is represented using an expression:

$$D_r = f(\tilde{L})$$

$$\tilde{L} = \frac{D^2}{\|D^2\|};$$

$$\|D^2\| = \sqrt{\frac{1}{2} D^2 : D^2};$$

wherein $D_r$ represents an anisotropic rotary diffusion tensor; $\tilde{L}$ represents a second order symmetric tensor; and $D^2$ represents the square of the rate-of-deformation tensor.

15. The non-transitory computer medium of claim 11, wherein the anisotropic rotary diffusion effect is represented using an expression:

$$D_r = C_I I - C_I C_M \frac{D^2}{\|D^2\|};$$

wherein I represents an identity matrix; $D^2$ represents the square of the rate-of-deformation tensor; and $C_I$ and $C_M$ represent a fiber-fiber interaction and a fiber-matrix interaction, respectively.

16. The computer-implemented simulation method of claim 11, wherein the anisotropic rotary diffusion effect is represented using an expression having a first parameter and a second parameter, an increasing of the first parameter decreases a fiber alignment degree and an increasing of the second parameter increases a fiber alignment degree.

17. The computer-implemented simulation method of claim 11, wherein the anisotropic rotary diffusion effect is represented using a two-parameter tensor equation, and obtaining the two-parameter tensor equation comprises:

obtaining a tensor-valued function using an expression:

$$D_r = b_1 I + b_2 A + b_3 A^2 + \frac{b_4}{\dot{\gamma}} D + \frac{b_5}{\dot{\gamma}^2} D^2;$$

wherein I represents an identity matrix, A represents a second order orientation tensor, and D represents the rate-of-deformation tensor;

setting $b_2=0$, $b_3=0$, and $b_4=0$;

setting $b_1=C_I$ and $b_5=-4C_I C_M$, wherein $C_I$ and $C_M$ represent a fiber-fiber interaction and a fiber-matrix interaction, respectively.

18. The non-transitory computer medium of claim 11, wherein the anisotropic rotary diffusion effect is determined without taking into consideration a second order orientation tensor.

19. The non-transitory computer medium of claim 18, wherein the anisotropic rotary diffusion effect is determined without taking into consideration the square of the second order orientation tensor.

20. The non-transitory computer medium of claim 11, wherein the calculating of the orientation distribution of the fibers is performed by taking into consideration the anisotropic rotary diffusion effect of the fibers and the shear rate distribution when the fluid is transferred into the mold cavity from the molding machine.

\* \* \* \* \*